W. J. H. STRONG.
HOT AIR MOTOR.
APPLICATION FILED MAY 21, 1917.
1,365,206.
Patented Jan. 11, 1921.
3 SHEETS—SHEET 3.
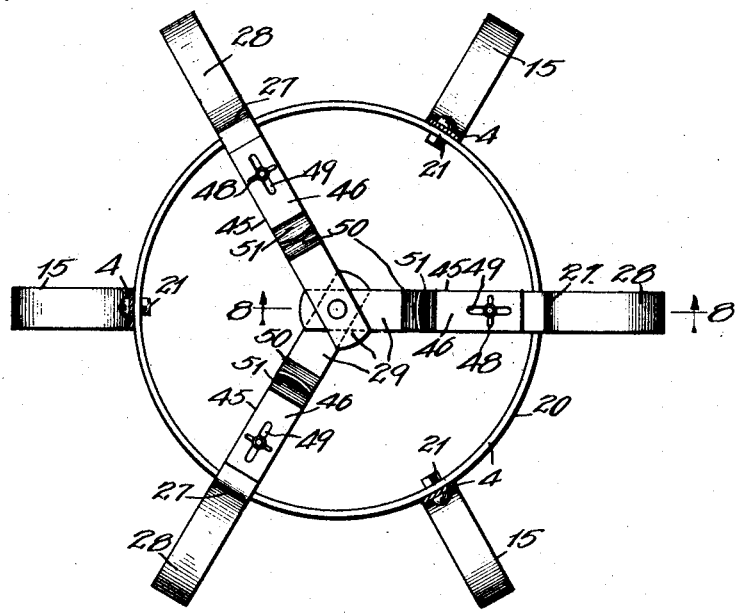
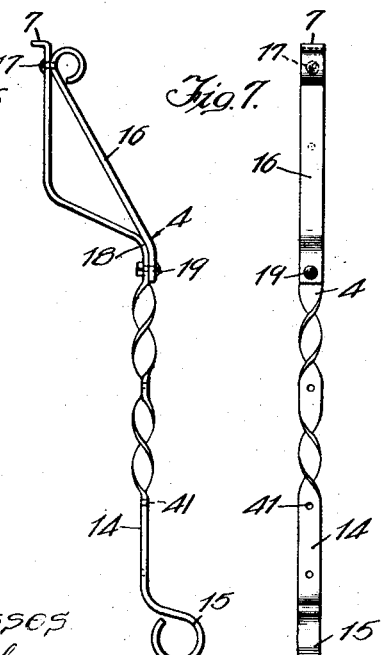
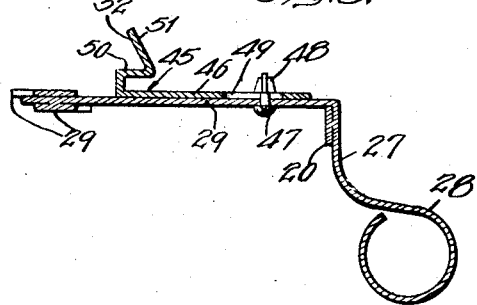
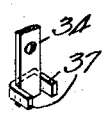
Witnesses
W. P. Kilroy
Harry R. White
Inventor:
William J. H. Strong
By Edward Fay Wilson
Atty.

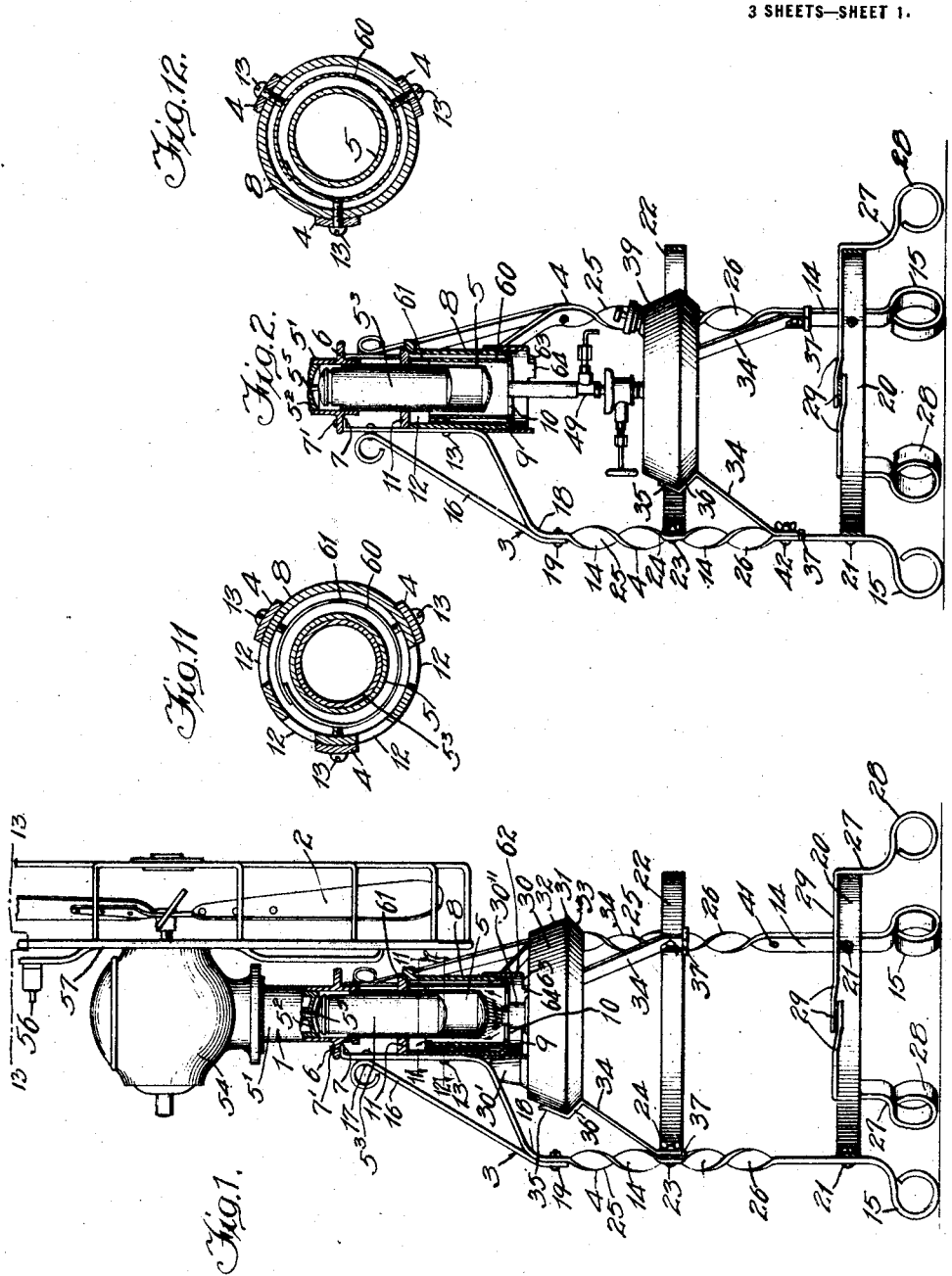

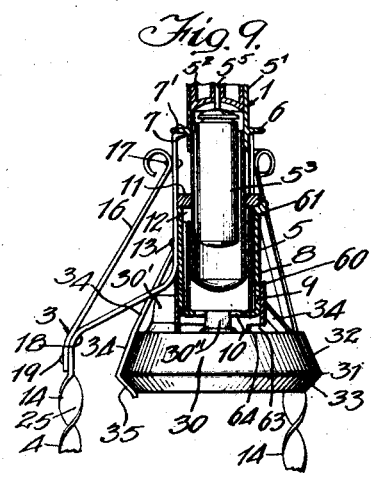
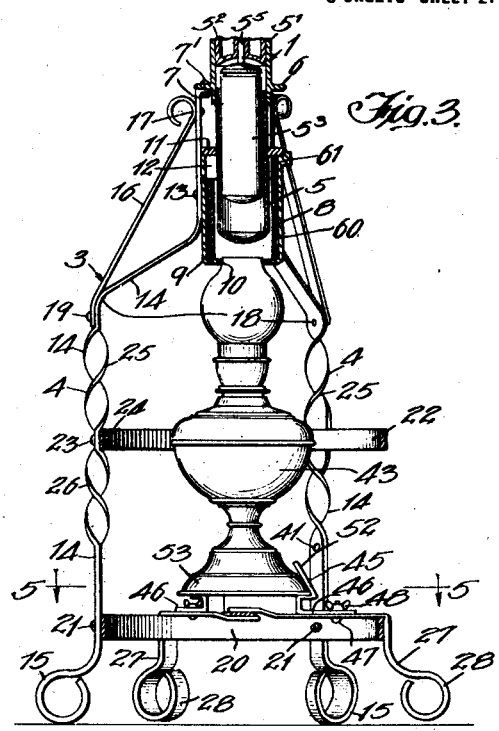
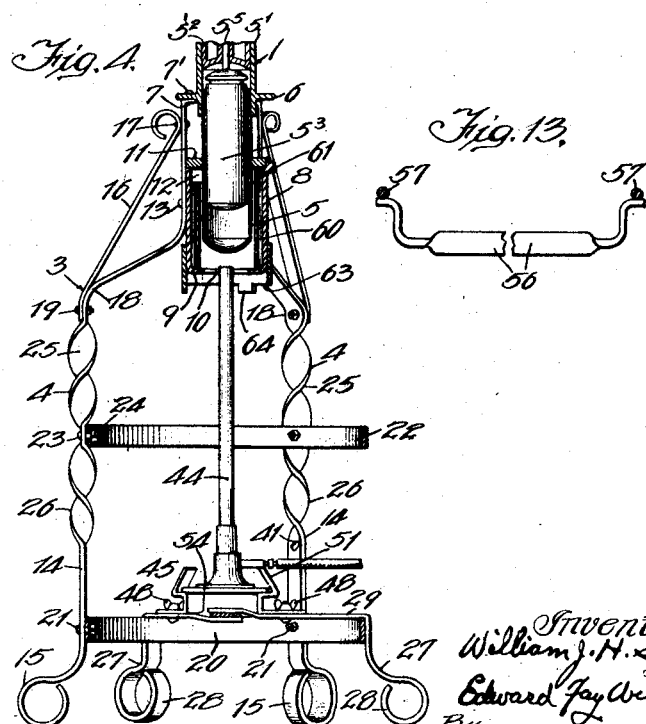

UNITED STATES PATENT OFFICE.

WILLIAM J. H. STRONG, OF CHICAGO, ILLINOIS.

HOT-AIR MOTOR.

1,365,206. Specification of Letters Patent. Patented Jan. 11, 1921.

Application filed May 21, 1917. Serial No. 170,115.

*To all whom it may concern:*

Be it known that I, WILLIAM J. H. STRONG, a citizen of the United States, and a resident of Chicago, county of Cook, and State of Illinois, have invented a certain new, useful, and Improved Hot-Air Motor, of which the following is a specification.

My invention relates to improvements in motors particularly adapted for driving fans and has special reference to motors which are operated or driven by heated air.

The object of my invention is to provide a stand or support for such a motor which shall be capable of properly supporting fuel tanks or burners for using or employing any one of a number of different fuels; which shall be capable of being easily and readily changed from one form of fuel to another, as occasion shall require; which shall be so constructed that it can be readily dismembered or taken apart for packing in a minimum compass for shipment; which though of a minimum weight shall be so constructed that it shall be of relatively great strength; which can be manufactured at a very low cost; and which shall stand firmly upon a surface, even though it be not perfectly level, and which, though top heavy, shall not be easily tipped over.

A further object of my invention is to provide means whereby the escaping gases of combustion shall be prevented from being projected by the fan in a strata but on the other hand shall be mingled with so much free air as to be unnoticeable when the fan is operating.

My invention consists in a motor stand or support built up of a number of relatively light, substantially flat members which when properly secured together and to the body of the motor, will form a rigid stand or support for holding the fan at a suitable height from the floor and which by the addition of suitable supporting members, shall be capable of being readily arranged to hold or carry burners or tanks for using any one of a number of different fuels.

My invention also consists in a stand for hot air motors and means for supporting fuel tanks or burners at different heights, and suitable for the kind of fuel used.

My invention also consists in a stand or support for a hot air motor in combination with supports arranged to be secured at suitable heights for supporting burners for the proper use of alcohol, gasolene, kerosene or gas and which stand is capable of being dissembled into relatively flat members for packing and shipment.

My invention also consists in a guard forming part of the stand, and so constructed that the direct flow of the gases of combustion into the draft caused by the fan is prevented.

My invention further consists in a hot air motor and stand as herein described and in the combinations and arrangements of devices, members and parts and in the features of construction by which I am enabled to attain the above mentioned and other objects and all as herein described and particularly pointed out in the appended claims.

My invention will be more readily understood by reference to the accompanying drawings forming part of this specification, illustrating a preferred embodiment of my invention and in which:—

Figure 1 is a fragmentary central vertical section of my improved hot air motor carrying an alcohol fuel tank;

Fig. 2 is a similar view, except that a gasolene fuel tank is shown;

Fig. 3 is a similar view of the stand shown carrying a kerosene lamp as the fuel source;

Fig. 4 is another similar view but in this instance a gas burner is shown;

Fig. 5 is a horizontal plan section on the line 5—5 of Fig. 3, the lamp not being shown;

Figs. 6 and 7 are detail elevations of one of the main leg members;

Fig. 8 is a vertical section of the base through one of the auxiliary leg or foot members on the line 8—8 of Fig. 5;

Fig. 9 is a fragmentary vertical section showing a slightly modified manner of supporting a fuel tank;

Fig. 10 is a perspective view of the lower or fixed end of one of the spring font supports;

Fig. 11 is a detail horizontal section on the line 11—11 of Fig. 1;

Fig. 12 is a similar section on the line 12—12 of Fig. 1; and

Fig. 13 is a detail section on the line 13—13 of Fig. 1.

One of the more recent luxuries to be developed is that of the provision of a blast of air for cooling purposes such as has become possible by the modern development of the electric fan. There are however, many countries and situations where the delights and comforts of the electric fan are not available but where even the greatest necessity for such comfort exists, mainly on account of the extremely hot weather such countries experience.

Fans have been operated by hot air motors, to some extent, by alcohol or gasolene but these fuels are not always available. It is one of my special objects to provide a fan of the above character which can properly and effectively operate or run upon alcohol, gasolene, kerosene or gas, and to so construct the stand or support that it can be readily arranged to properly support a suitable burner, tank or font for any of these fuels, and which stand shall be neat in appearance, light in weight and stable in position.

In said drawings 1 represents a hot air motor, in the instance shown, adapted to drive a fan 2. I support the motor and fan at a suitable height by means of a skeleton stand 3, which comprises main leg members 4, preferably three, made up of light flat bars of metal, and several rings or joining members, the whole adapted to be readily taken apart and reduced to substantially thin flat members easily packed within a minimum space for shipment.

The motor is a hot air motor and in so far as the present invention relates thereto, comprises a depending hollow cylindrical chamber 5 closed at its lower end and secured at its upper end to the lower end of the short working cylinder $5^1$ in which the piston $5^2$ works up and down. Below the piston $5^2$ and moving oppositely thereto is a cylindrical displacer $5^3$ which works up and down within the cylindrical chamber 5. Upon the upper end of the working cylinder I securely mount the shaft casing $5^4$. The piston rod $5^5$ of the displacer $5^3$ operates through a central opening in the piston $5^2$.

I provide a circumferential thin flange 6 at the lower end of the working cylinder $5^1$ which serves to radiate heat therefrom and to which I secure the upper ends of the legs 4. For securely supporting the motor on the legs 4, I bend the upper ends 7 of the legs 4 inwardly to form shoulders upon which to rest the flange 6 and I removably fasten the legs to the flange by means of screws 7' which pass through the flange and are received in suitable threaded holes in the legs.

Spaced below the flange 6 and surrounding the lower end of the hollow cylinder 5, I provide a hollow metal cylindrical guard 8. This guard is provided with a contracted lower end 9 having a central opening 10 to admit the hot gases from the burner used and it is open at its upper end. I provide a washer-like baffle plate 11 which rests upon and closes the upper end of the guard cylinder and prevents the direct impingement of the hot gases against the cylinder 5 above this point. To provide an outlet for the hot gases of combustion, I provide notches or openings 12 in the upper edge of the guard cylinder 8 through which the gases can escape. If these notches or openings were spaced equally around the circumference of the guard cylinder the suction of the fan 2 would draw the hot gases out and project them in more or less of a strata in the projected air. To prevent this undesirable action I place the openings 12 only on the sides and the rear of the guard cylinder not on the side toward the fan 2 and consequently as the hot gases rise and are drawn up and around the body of the motor and into the fan they are in the process so thoroughly mixed with such a large volume of air that the heat derived therefrom is practically unnoticeable to one receiving the blast of air from the fan.

I removably support the guard cylinder 8 upon the legs 4 by means of screws 13 and the guard therefore also serves the purpose of a spacing ring for the legs and assists in making the stand 3 a rigid structure.

Each leg 4 consists of a main longitudinal member 14 which is secured at its upper end to the body of the motor as explained and which extends outwardly and downwardly from the lower end of the motor to provide sufficient space between the several legs to receive the various fuel tanks.

The lower parts of the several legs are vertical and parallel, except that adjacent to their lower ends they are again inclined outwardly to provide an extended base.

I provide very light substantial feet on the several legs by forming the lower ends thereof into open rings 15. To make the upper ends of the legs rigid and keep this part of the stand light, I provide an inclined strap metal brace 16 which I secure solidly to the upper part of the leg by the fastener 17 and to the upper shoulder 18, of the member 4 by the fastener 19. To hold the three legs rigidly in position and make them rigid as a whole, I provide a lower horizontal spacing ring 20 which I secure to each of the three legs by bolts 21. I arrange this ring above the lower ends of the legs and within the parallel portions thereof. I provide a second spacing ring 22 which I secure in horizontal position to the several legs about midway between the lower ring 20 and the lower end of the motor 1. I secure the ring 22 in place by the bolts 23 and thumb nuts 24. Between the ring 22 and the bottom of the motor and between the two rings 20 and 22 I twist the bars or straps of which the legs 4 are formed, as shown at 25 and 26. These twists or turns make the legs 4 more rigid radially than they would be otherwise.

The three legs 4, as formed, together with the guard cylinder 8 and the two spacing rings, 20 and 22, secured in place, provide a stand which is rigid, strong and light.

For the purpose of giving added stability to the device as a whole and to prevent any accidental tipping of the motor in a direction between the three feet 15 I provide additional legs 27 having feet 28 equi-spaced between the feet 15 and secured to the lower ring 20 preferably by welding. I bend the upper ends 29 of these legs 27 inwardly immediately above the ring 20 and offset their inner ends, as shown in the several figures, so that they will properly overlap at the center of the ring 20 in contact with each other and I secure them rigidly together at the center of the ring 20 preferably by welding. Consequently the lower ring 20 with the auxiliary legs constitutes a unitary structure not liable under ordinary usage to be loosened at any connecting point.

The feet 28 are auxiliary to the main feet 15 and are not intended ordinarily to rest upon or touch the floor. I therefore, make the legs 27 of such a length that the feet 28 are normally out of contact with the floor, as shown in the drawings, but they are normally close to the floor and in position to contact therewith upon the slightest tipping movement of the motor. Consequently, I have provided a stand which will rest firm and solid when undisturbed, as it has three points of support, and also one which cannot be easily tipped over on account of the auxiliary feet extending outwardly substantially midway between the normal supporting feet. While the same end of stability might be attained by more widely extending the feet 15 in relation to the height of the fan, this would enlarge the several pieces and not permit them to be packed within such a small compass for shipment.

In order that the knock-down feature of the fan stand may be clearly understood, I have shown, in Figs. 6 and 7, one of the legs 4 separate from the other parts, and it will be seen that it is a very light substantially flat member and occupies but a small space. In packing the stand for shipment there are the three legs 4 the ring 20 carrying the three auxiliary legs the middle ring 22 and the guard cylinder 8, all of which can obviously, when taken apart, be packed within a small compass or space.

I will now describe the several burners and the simple means I have provided for securing the different burners in place. 30 represents an alcohol font or tank having a filling plug 31 at one side and a central burner 30″ adapted, when the font is in place to project through the central opening 10 in the guard 8. The font is circular in shape and has a circumferential rib or ridge 31 on its periphery. In fact the outer periphery is formed of two conical surfaces, 32 and 33 which meet and form the ridge 31. I have found that it is best to hold the font 30 with a yielding pressure rather than let it rest freely upon a support, as I am thus enabled to prevent any rattle or noise due to the slight vibration caused by the operation of the motor. I consequently provide three spring supports 34 which are formed at one end with flaring ends 35 and shoulders 36 to receive and engage the periphery of the font 30 and at the other end each is provided with a hole to receive one of the bolts 23 the thumb nuts 24 with which I provide these bolts, permitting the easy placement of these spring supports in place. To aid in holding these supports in upright position, I provide outwardly extending projections 37 on the lower ends of each adapted to contact with the lower edge of the ring 22 and thus prevent the support from swinging around on its bolt.

Instead of securing the supports to the legs of the stand as described, I may secure them to the guard cylinder 8 as shown in Fig. 9 at 38 and in depending position instead of in upwardly extending position. In this case, the flaring ends 35 instead of the shoulders 36 carry the weight of the font.

For gasolene, I provide the font 39, see Fig. 2. This font is similar in size and shape to the font 30 but instead of the short burner 30″ as used with the alcohol font 30 I provide a burner 49 of suitable length for properly vaporizing the gasolene and as this is much longer than the burner 30″ the font, in this instance, must be supported at a relatively lower elevation. For this purpose, I provide bolt holes 41 in the legs 4 to receive bolts 42 for securing the spring supports to the legs at the proper height to properly support the gasolene font. In this instance the supports 34 are held in upright position against turning around on their bolts 42 by the projections 37 which as shown in Fig. 11, are spaced apart far enough to engage the side edges of the leg 4 to which it is secured.

In placing the alcohol or gasolene fonts in position in the stand or removing them from the stand, it is only necessary to spring the free ends of the yielding supports 34 outwardly, sufficiently to permit the passage of the font into or out of its supported position.

In Fig. 3 I have shown a kerosene burner in the form of a lamp 43 and as this is very much taller than either the alcohol or gasolene burner I arrange to support and secure it to and upon the base of the stand. As described hereinbefore, I secure the inturned ends of the auxiliary legs 27 together, at the center of the ring 20 and these form a base upon which to support both the lamp 43 and the high burner 44 which I provide for burning ordinary illuminating or fuel gas.

To secure the lamp and gas burner in position, I provide three supports 45 made of strap metal, each having a horizontal part 46 for resting upon one of the horizontal parts 29 of the auxiliary leg members 27. I secure these supports to the leg members 27 by bolts 47 provided with thumb nuts 48 and, to allow radial adjustment of the supports 45 I provide each thereof with a longitudinal slot 49 through which the bolt 47 projects and by means of which the support can be adjusted radially relatively to the base. I bend the inner end of each support 45 upwardly and then outwardly to form a horizontal shoulder 50 raised slightly above the base so that whatever is held on the shoulders 50 will be held solidly on three bearing points. I then bend the free end 51 of each support inwardly or toward the center of the stand at an angle to the shoulder 50 to provide an overhanging projection 52 adapted to engage and firmly retain the base 53 of the lamp 43 or the base 54 of the gas burner 44.

In supporting a lamp or a gas burner in place, the several supports 45 are placed approximately in position, the burner or lamp is then placed thereon with its upper end properly registering with the central opening 10 in the guard cylinder 8 and its base resting on the shoulders 54 and within the overhanging projections 52. Then the several supports are pushed inwardly to properly clamp the outer edge of the base of the lamp or burner, after which the screws 47 are tightened to hold the supports rigidly in position. It is obvious that thereafter, should it be desirable or necessary to remove the burner or lamp, but one of the supports, 45 need to be loosened.

The cage-like openwork stand which I have provided, in which the fuel tanks are supported, in combination with the improved guard tube 8 results in several valuable features. The openwork stand permits the free circulation of the air around the fuel fonts thus preventing their over heating, and the improved guard tube 8 prevents the dissipation of the heat of the flame and also prevents the hot gases of combustion flowing in a strata through the fan.

The fan as a whole is adapted to be semi-portable, that is it is intended to be easily moved from place to place for use and for that reason, though somewhat top heavy it is not arranged to be permanently fastened or secured in place. The three auxiliary feet prevent any accidental tipping. I provide a very convenient handle 56, secured solidly to the frame work or guard 57 of the fan with which to lift and carry the fan. This handle is a horizontal bar secured at its ends to the frame work 57, preferably by welding and I arrange the handle substantially vertically above the center of gravity of the fan so that it can be lifted by the handle even when running without danger of accident.

For the purpose of increasing the efficiency of the motor I provide a light guard sleeve 60 of a smaller diameter than the inner diameter of the guard cylinder 8 and arranged within same, as shown in the several figures. This sleeve rests at its lower end upon the upper surface of the lower end 9 of the guard cylinder 8 and effectually prevents the hot gases of combustion flowing upward along the inner wall of the guard cylinder 8. In fact the cylindrical space which I thus provide between the sleeve 60 and the guard cylinder 8 is a dead air space which serves to insulate the guard cylinder and reduce its temperature. Further the hot gases of combustion are, by the sleeve 60 directed into closer contact with the cylindrical chamber 5 of the motor and a larger proportion of the heat is consequently turned into power. The sleeve 60, as shown in Figs. 11 and 12, is split vertically at one point and the edges thus provided overlap each other thereby making the sleeve adjustable as to diameter, and I hold the sleeve central within the guard cylinder 8 by means of the inner ends of the screws 13 which secure the legs 4 to the guard cylinder. The sleeve 60 does not reach to the top of the guard cylinder 8 but stops at the level of the lower edge of the vent openings 12, and I provide a tail piece or spacer 61 on the upper end of the sleeve to contact with the washer 11 and prevent the vertical displacement of the sleeve.

As a further means of increasing the efficiency of the motor and protecting the flames of the burners I provide a short cylindrical sheet metal guard 62 adapted to surround the lower end of the guard cylinder 8 and project down around the burner 30''. I cut away the lower end of this sheet metal guard cylinder forming inlet openings 63, for air and providing several downwardly extending projections 64 adapted to contact with the upper surface of the font 30 as best shown in Fig. 1. This guard cylinder is made like the guard sleeve 60 in that it is split along a vertical line and is so formed as to size that when it is pushed up on the lower end of the guard cylinder 8 it hugs the cylinder sufficiently tight to be held in place even when the font 30 is removed. It is made of a length so that its upper end contacts with the legs 4 thus accurately placing it vertically, even when the gasolene font is used, as shown in Fig. 2. The sheet metal guard cylinder 62 is of benefit as it prevents the strong currents of air induced by the operation of the fan from disturbing or deflecting the flame from the burner.

As many modifications of my invention will readily suggest themselves to one skilled in the art I do not limit or confine my invention to the specific structures herein shown and described.

I claim:

1. A stand for a hot-air motor or the like, comprising a plurality of main leg members adapted to be removably secured to a motor at their upper ends, a ring removably secured to the several legs adjacent to their lower ends, and means adapted to be removably secured to the stand for removably supporting a fuel font or burner beneath the motor, the stand as a whole being capable of being readily taken apart and packed within a minimum space for shipment.

2. A stand for a hot-air motor, comprising a plurality of main leg members adapted to be removably secured to a motor at their upper ends, spacing rings removably secured to the several legs below the motor, the lower of said rings arranged near the base of the stand, and auxiliary legs carried by said lower ring circumferentially substantially midway between the main leg members, and said auxiliary legs terminating slightly above the lower extremities of the main legs.

3. A hot-air motor in combination with a knock down stand therefor comprising a plurality of equi-spaced main leg members, adapted to be removably secured at their upper ends to the body of the motor, a spacer removably secured to the several legs adjacent to their lower ends, and auxiliary legs terminating at their lower ends above the lower ends of the main legs and secured to said spacer substantially midway between the main leg members.

4. A hot-air motor in combination with a knock down stand therefor comprising three equi-spaced main leg members adapted to be removably secured at their upper ends to the body of the motor, a spacing ring removably secured to the several legs adjacent to their lower ends, auxiliary legs shorter then the main legs secured to said ring substantially midway between the main leg members and terminating at their lower ends above the lower ends of the main leg members, said auxiliary legs formed to extend inwardly over said ring into overlapping relation and means securing the overlapped ends thereof rigidly together.

5. A hot-air motor in combination with a knock down stand therefor comprising three equi-spaced substantially flat main leg members, adapted to be removably secured at their upper ends to the body of the motor, a spacing ring removably secured to the several legs adjacent to their lower ends, auxiliary legs arranged between the main legs and carried by said ring said auxiliary legs being shorter than the main legs, a second spacing ring removably secured to the several legs substantially midway between the lower ring and the motor, and means carried by said stand for removably supporting burners thereon for operating said motor.

6. In a skeleton, portable, motor stand three main feet circumferentially equi-spaced, and three alternate auxiliary feet spaced circumferentially substantially midway between the main feet, said auxiliary feet terminating at their lower ends slightly above the terminations of the main feet to provide normally non contacting feet to prevent the accidental tipping of the motor supported on the stand.

7. A stand for a hot-air motor in combination with means removably carried by the stand for yieldingly and removably supporting a fuel oil font below a motor, and means for securing said supporting means at different heights.

8. A stand for a hot-air motor comprising three removable main leg members, a ring for holding the lower ends of the legs rigidly together, and yielding fuel oil font supports secured one to each leg at one end and extending inwardly, the free end of each support formed to engage the periphery of the font and provided with a shoulder for supporting the font.

9. A stand for a hot-air motor comprising three removable main leg members, a ring for holding the lower ends of the legs rigidly together, and yielding fuel oil font supports secured one to each leg at one end and extending inwardly, the free end of each support formed to engage the periphery of the font and provided with a shoulder for supporting the font, the secured end of each support provided with outwardly extending projections for contact with parts of the stand for preventing the displacement of the font supports.

10. In a hot-air motor driven fan, a cylinder adapted to be heated to operate the motor, a cylindrical guard surrounding the cylinder having a central opening at its lower end for the reception of a burner, a fan operated by the motor and adapted to draw air past said guard, said guard provided with outlet openings at its upper end at points distant from the fan to prevent the direct draft of the hot gases of combustion by the fan and cause said hot gases to be mixed with a relatively large volume of air in passing through the fan.

11. In a hot-air-motor driven fan, a hot air motor, a fan attached thereto and driven thereby, a skeleton frame work attached to and supporting the motor and fan at a suitable elevation, a metal liquid-fuel tank provided with a burner for running the motor, and adjustable supports on the frame work for holding the fuel tank and whereby said tank is held in exposed condition.

12. A hot-air-motor driven fan comprising a hot air motor, a fan attached thereto and driven thereby, a relatively high skeleton frame work attached to and supporting the fan, adjustable font supports carried by said frame work, said frame work constructed to be easily taken apart and constituting a number of members adapted to be packed within a minimum space for shipment.

13. A hot-air motor having a depending cylinder closed at its lower end and adapted to be heated to cause the motor to operate, in combination with a stand for supporting the motor at a suitable height, said stand consisting of a plurality of relatively flat leg members adapted to be removably secured at their upper ends to the body of the motor, a guard ring surrounding the lower end of the motor cylinder having a central opening at its lower end to receive a burner, said guard ring removably secured to each of said legs supported thereby and constituting a spacing ring for said stand, a spacing ring adjacent to the lower ends of said legs removably secured thereto, a third spacing ring substantially midway between the other rings and removably secured to the several legs, whereby the stand as a whole can be readily dismembered for shipment.

14. A hot-air motor having a depending cylinder closed at its lower end and adapted to be heated to cause the motor to operate, in combination with a stand for supporting the motor at a suitable height, said stand consisting of a plurality of relatively flat leg members adapted to be removably secured at their upper ends to the body of the motor, a guard ring surrounding the lower end of the motor cylinder having a central opening at its lower end to receive a burner, said guard ring removably secured to each of said legs supported thereby and constituting a spacing ring for said stand, a spacing ring adjacent to the lower ends of said legs removably secured thereto, a third spacing ring substantially midway between the other rings and removably secured to the several legs, whereby the stand as a whole can be readily dismembered for shipment, and supports for a fuel oil tank having a burner removably secured to the several legs and adapted to hold the fuel oil tank beneath the motor with its burner in registry with said opening in the lower end of the guard ring.

15. In a hot-air motor a depending thin walled hot air chamber closed at its lower end, a displacer adapted to be reciprocated within said chamber, a guard cylinder surrounding said chamber having a contracted lower end below the lower end of said chamber and provided with a central opening to receive the upper end of a suitable burner, and a guard sleeve within said guard cylinder spaced inwardly from the wall thereof thereby providing a heat resisting chamber and adapted to guide the products of combustion from said burner into close contact with said hot air chamber.

16. In a hot-air motor a depending thin walled hot air chamber closed at its lower end, a displacer adapted to be reciprocated within said chamber, a guard cylinder surrounding said chamber having a contracted lower end below the lower end of said chamber and provided with a central opening to receive the upper end of a suitable burner, a guard sleeve within said guard cylinder spaced inwardly from the wall thereof thereby providing a heat resisting chamber and adapted to guide the products of combustion from said burner into close contact with said hot air chamber, and means carried by said guard cylinder for holding said sleeve central.

17. In a hot-air motor a depending thin walled hot air chamber closed at its lower end, a displacer adapted to be reciprocated within said chamber, a guard cylinder surrounding said chamber having a contracted lower end below the lower end of said chamber and provided with a central opening to receive the upper end of a suitable burner, a guard sleeve within said guard cylinder spaced inwardly from the wall thereof thereby providing a heat resisting chamber and adapted to guide the products of combustion from said burner into close contact with said hot air chamber, and means preventing endwise movement of said sleeve, a substantially annular outlet opening being provided at the upper end of said sleeve.

18. In a hot air motor a depending thin walled hot air chamber closed at its lower end, a displacer adapted to be reciprocated within said chamber, a guard cylinder surrounding said chamber having a contracted lower end below the lower end of said chamber and promoted with a central opening to receive the upper end of a suitable burner, and an extension burner protector comprising an expansible metal cylindrical shell adapted to surround and be carried by the lower end of said guard cylinder and to project below the lower end thereof and surround the burner which is adapted to project into said central opening.

19. In a hot-air motor a depending thin walled hot air chamber closed at its lower end, a displacer adapted to be reciprocated within said chamber, a guard cylinder surrounding said chamber having a contracted lower end below the lower end of said chamber and provided with a central opening to receive the upper end of a suitable burner, and an extension burner protector comprising an expansible metal cylindrical shell adapted to surround and be carried by the lower end of said guard cylinder and to project below the lower end thereof and surround the burner which is adapted to project into said central opening, the lower end of said protector provided with downward extending projections separated by notches whereby when the flat top of a fuel tank is placed against the lower ends of said projections air inlet openings are provided to admit air to the burner carried by the fuel tank.

20. In a hot-air motor, a relatively thick walled working cylinder, a relatively thin walled hot air cylinder depending therefrom, a relatively thin heat radiating, circumferential flange on the lower end of the working cylinder, legs surrounding the hot air chamber and attached at their upper ends to said circumferential flange.

In testimony whereof, I have hereunto set my hand this 8th day of May, 1917, in the presence of one subscribing witness.

WILLIAM J. H. STRONG.

Witness:
E. F. WILSON.